Dec. 8, 1931.  G. POPP  1,835,670
AGRICULTURAL MACHINE
Filed Oct. 3, 1930  5 Sheets-Sheet 2
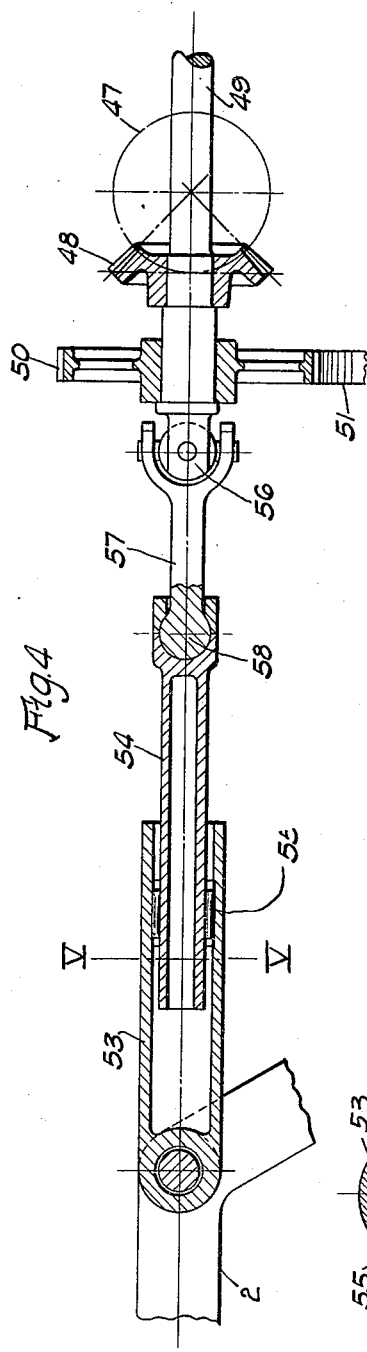
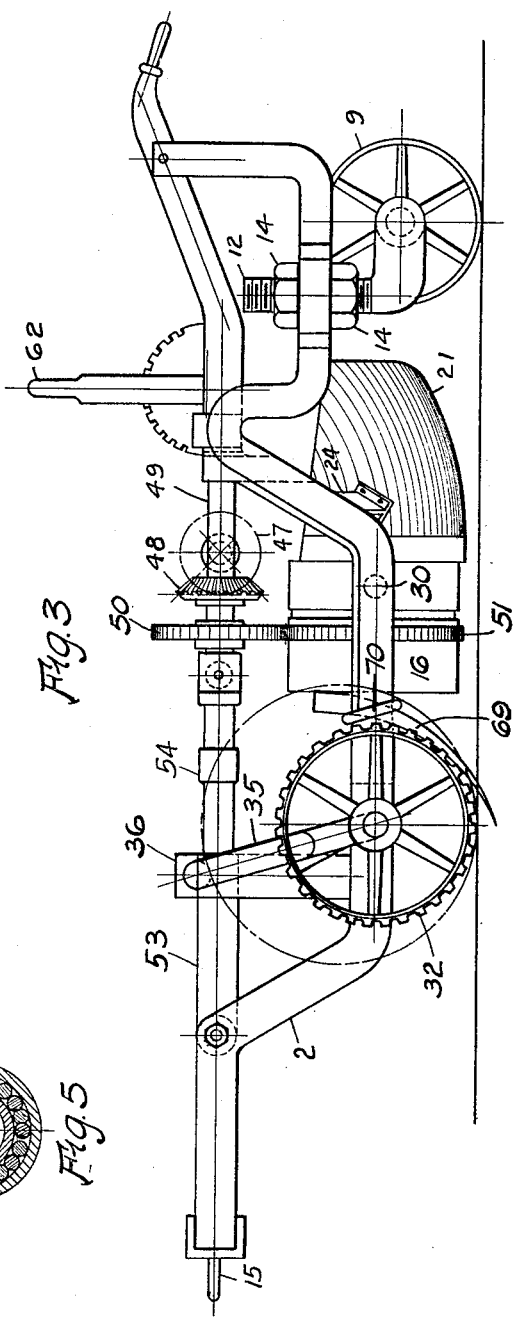
INVENTOR.
George Popp.
BY
ATTORNEY

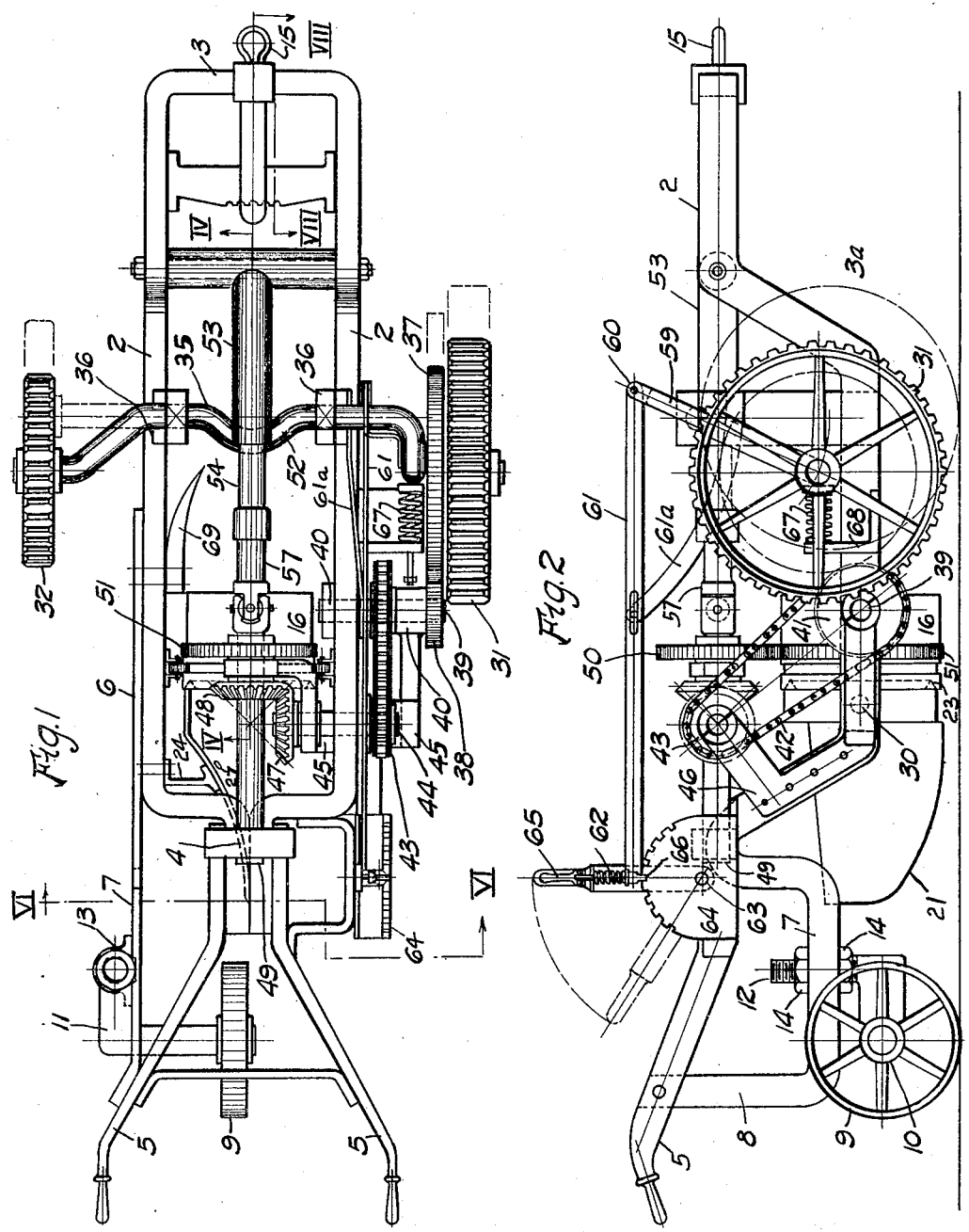

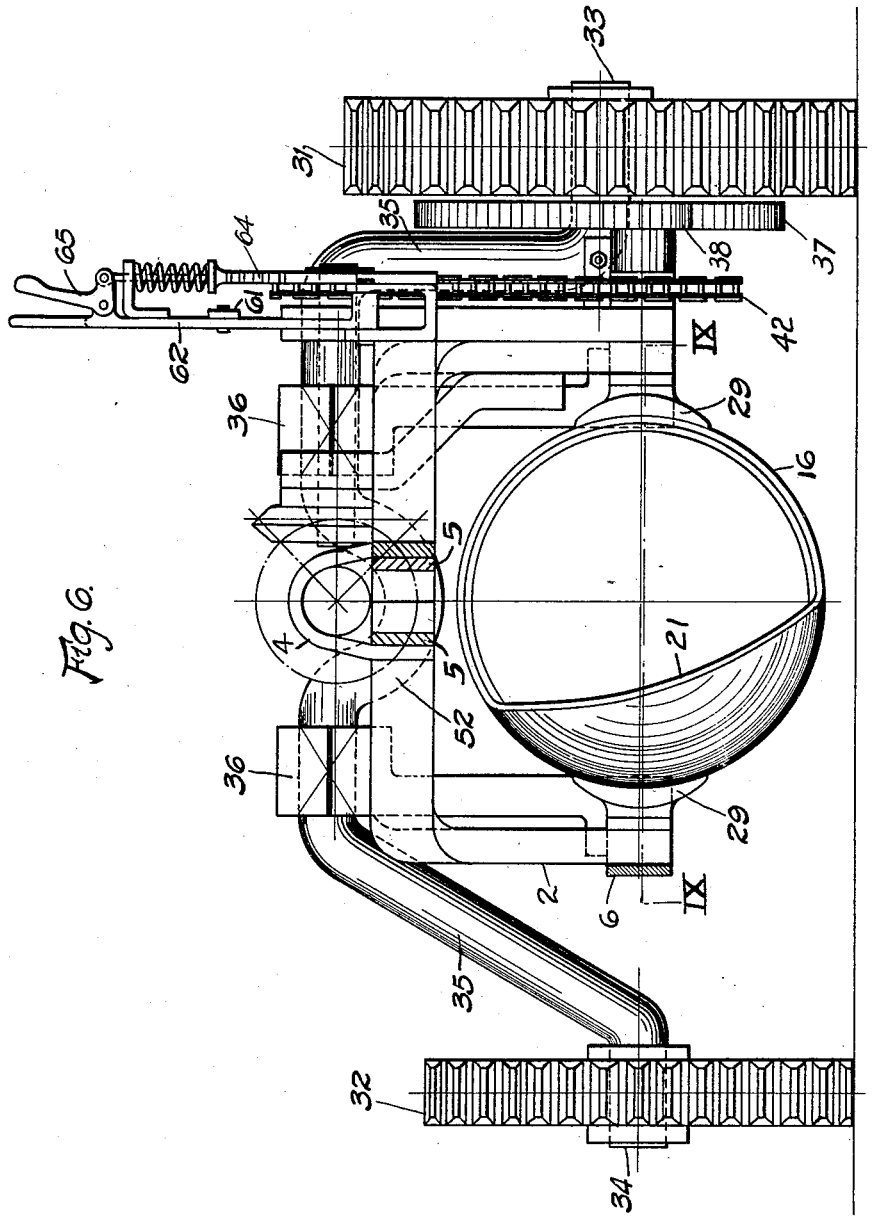

Dec. 8, 1931.  G. POPP  1,835,670
AGRICULTURAL MACHINE
Filed Oct. 3, 1930   5 Sheets-Sheet 4
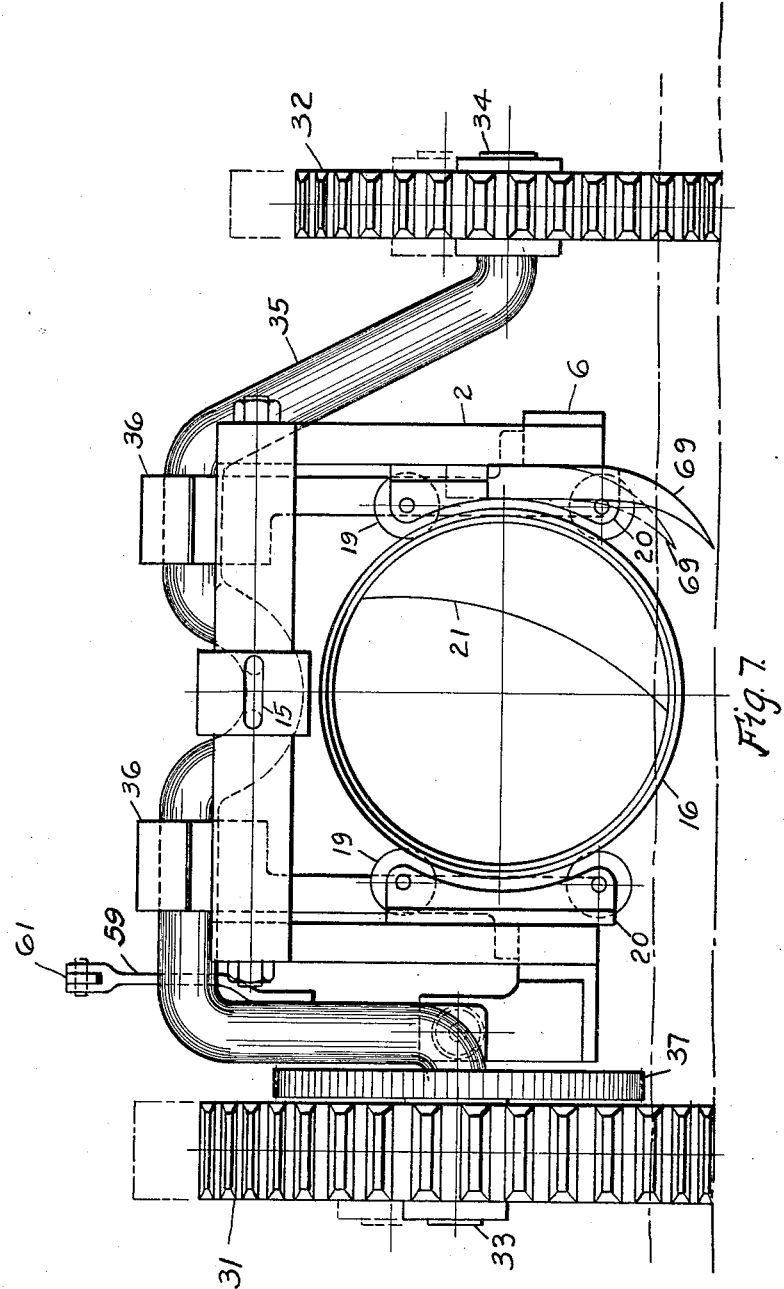
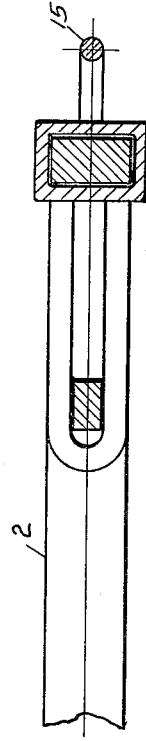
INVENTOR.
George Popp
BY C. M. Clarke
ATTORNEY Dec. 8, 1931.  G. POPP  1,835,670
AGRICULTURAL MACHINE
Filed Oct. 3, 1930  5 Sheets-Sheet 5
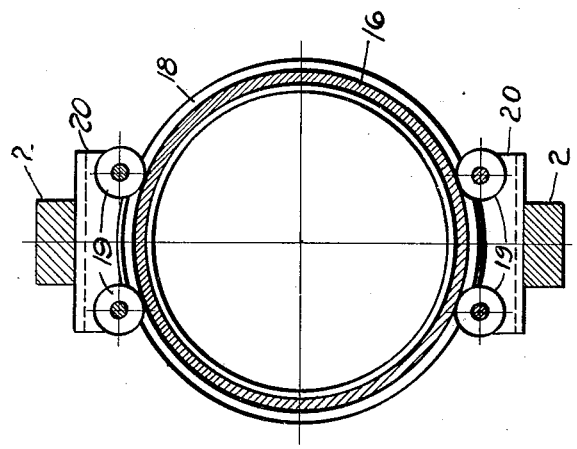
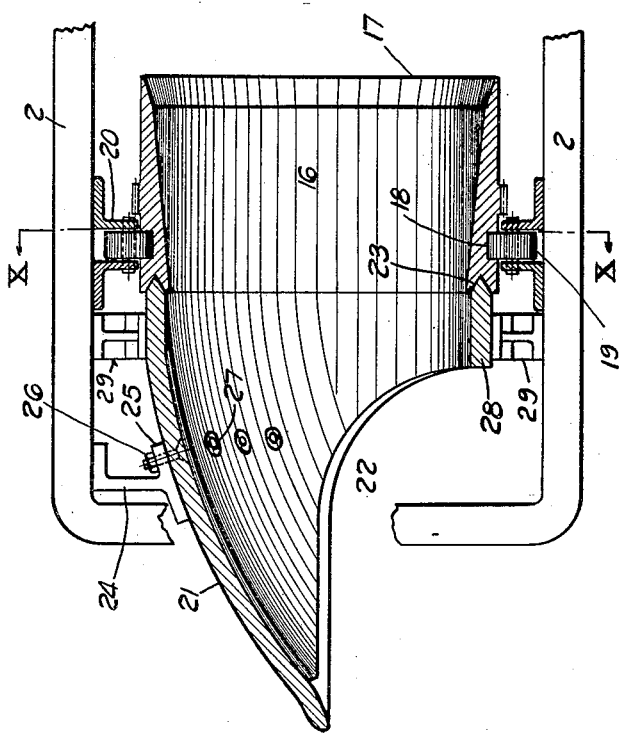
INVENTOR
George Popp
by O. M. Clarke
Attorney Patented Dec. 8, 1931

1,835,670

UNITED STATES PATENT OFFICE

GEORGE POPP, OF AMBRIDGE, PENNSYLVANIA

AGRICULTURAL MACHINE

Application filed October 3, 1930. Serial No. 486,159.

My invention refers to improvements in agricultural implements or machines for cultivating, plowing, ditching, etc., or for other purposes or uses to which it may be applied.

The machine comprises a main supporting frame provided with rear traction wheels adjustably mounted thereon, and a front supporting wheel, a rotatable ditching or excavating element, a distributing share or shoe adapted to variably dispose of the disturbed earth, means for adjusting the traction wheels, means for imparting movement from one of said wheels to the active earth-disturbing means, and various other features of construction and operation, as shall be more fully hereinafter described.

Referring to the drawings, illustrating one preferred embodiment of the invention:

Fig. 1 is a plan view of the machine with the traction wheels therein rearwardly for operative connection with the driving mechanism;

Fig. 2 is a view in side elevation of said machine;

Fig. 3 is a similar view from the opposite side;

Fig. 4 is an enlarged longitudinal sectional view on the line IV—IV of Fig. 1 in the reverse direction thereof;

Fig. 5 is a further enlarged cross section on the line V—V of Fig. 4;

Fig. 6 is an enlarged vertical cross sectional view on the line VI—VI of Fig. 1;

Fig. 7 is a similar view in elevation from the opposite or advancing end of the machine;

Fig. 8 is an enlarged sectional detail view on the line VIII—VIII of Fig. 1;

Fig. 9 is a longitudinal sectional detail view on the line IX—IX of Fig. 6;

Fig. 10 is a cross section on the line X—X of Fig. 9.

Referring to the drawings, the main supporting frame of the machine is composed of side bars 2—2 of suitable structural or other metal shape having a front cross bar 3 and connected, as at 4, with a rear central bracket construction, providing a mounting for the guiding handles 5, similar to the handles of a plow or other typical cultivator form.

Depending below and rearwardly of one of the side bars 2 is a supporting frame or bar 6, bolted to the bar 2, bent downwardly as at 7 and then upwardly by extension 8 and secured to one of the arms 5, providing a rigid bracket mounting for the rear supporting wheel 9. Said wheel is rotatably mounted on the terminal 10 of an axle bar 11, having an upwardly extending stud 12, adjustably mounted in bracket 13 of bar 7, and capable of vertical adjustment therein by holding nuts 14.

By such mounting wheel 9, which provides a trailing support about centrally of the machine at its rear end, may be set upwardly or downwardly to vary the tilt or inclination of the machine within a considerable range, dependent on the work being done, contour of the ground, etc.

The front end of the machine is provided with a clevis or eye 15 of any suitable construction, by which the machine may be coupled to a tractor, team of horses, or other power-imparting element. The operative feature of the machine, adapted to disturb and sever the earth as the machine advances, is the rotatable cylindrical cutter 16. Such cutter, as shown, is of sufficient length and diameter to adapt it to rotatably engage the earth to a greater or less depth during forward movement of the machine, by rotation, for cutting action of the forward peripheral knife edge 17.

The cutter 16 is provided with an annular groove 18 into which extend a plurality, as two pairs, of guiding rollers 19 mounted in brackets 20 secured to the side bars 2. By such mounting, and with the rollers 19 sufficiently spaced apart, the cylindrical cutter is capable of easy rotation and maintenance of the position on the machine.

Rearwardly of cutter 16 is the earth deflecting fender 21, of cylindrical form forwardly, cut out at one side as at 22 for discharge of the earth, and provided at the opposite side with the shell-like extension, curved inwardly and rounded, so as to receive and discharge laterally the earth which is disturbed by the cutter 16. Fender 21 is in telescoping engagement with the rear end of cutter 16, as by a V-shaped edge extending into a corresponding groove 23 of the cutter, providing rotatable connection between such parts.

Fender 21 is fixedly mounted as by a bracket 24 secured to one of the side frames 2, having a flange 25, secured through the wall of the fender by bolts 26 preferably countersunk on their inner sides. The fender is provided with a plurality of similarly countersunk bolt holes 27, in rows, so that the fender may be variously turned in one direction or the other, and fixedly secured in position in stationary relationship to the rotatable cutter 16.

At its opposite sides the front annular portion 28 of fender 21 is supported by oppositely located shoes or braces 29 mounted by studs 30 in the depending portion of side bars 2. As will be observed, such side bars extend horizontally back from the front bar 3, then downwardly a suitable distance, then horizontally, and then upwardly to the original level where they are connected by bracket 4 with the handle bars.

The front portion of the machine is supported on the surface of the ground by a pair of wheels 31 and 32 respectively, wheel 31 being preferably of larger diameter than wheel 32 for increase of traction power, such wheel being utilized for imparting movement through intermediate gearing through the rotatable cutter 16.

Each of said wheels is rotatably mounted on the terminal journals 33 and 34 respectively, of a single continuous axle 35. As shown, such axle is of generally U-shaped form having depending portions at each side for such wheel mounting, and a main upper horizontal portion journalled in bearings 36 on the main frame, adapting the entire axle to be swung therein to adjust the wheel journals forwardly for ordinary travel without operation, and rearwardly for operative connection with the power transmitting gearing.

For such purpose the larger traction wheel 31 is provided with a pinion gear 37 adapted to make intermeshing engagement with a driven gear 38 mounted on the outer end of a shaft 39 which is rotatably mounted in bearings 40—40 of the main frame.

Intermediate of such bearings shaft 39 is provided with a sprocket-wheel 41 connected by a sprocket-chain 42 with a driven sprocket-wheel 43 mounted on the end of shaft 44. Such shaft is mounted in suitable bearings 45 mounted upwardly above the main side bars, as by brackets 46, and is provided at its inner end with a bevel wheel 47.

Such bevel wheel engages a corresponding bevel wheel 48 of the center drive shaft 49 having the driving pinion 50. Such pinion is in intermeshing engagement with gear 51 surrounding the outer portion of cutter 16.

By such construction, when gear 37 is thrust backwardly for driving engagement with gear 38, driving movement will be imparted to cutter 16 for its continuous rotation, during advancement of the machine.

The upper horizontal portion of axle 35 is deflected downwardly as at 52 for clearance of the shaft bearing 53, into which the shaft extension 54 telescopes for backward and forward movement and for rotation therein, intervening ball or roller bearings 55 being provided for such purpose.

For the purpose of avoiding friction due to intermittent bending strains or other causes, shaft 49 is provided with a universal joint 56, between its bevel gear driven portion and such rear extension, by section 57 and an intervening ball and socket joint 58. The rear end of shaft 49 is journalled in bracket 4, as shown in Fig. 1.

For the purpose of manipulating axle 35 to swing the traction wheels either forwardly or rearwardly on their pivotal mounting in journal bearings 36, the axle is provided with an upwardly extending arm 59 adapted to act as a lever beyond such pivotal mountings, to which, at 60, is pivotally connected the shift rod 61.

Said bar 61 has a slotted intermediate support on arm 61a and is pivotally connected to a shifting arm 62, pivoted at 63, at the base of a toothed segment 64 around which the shifting lever 62 is operable for setting the axle to geared or ungeared position, as shown in Fig. 2.

A releasable locking and unlocking lever 65 is mounted adjacent to the hand grip of lever 62 provided with a spring-actuated locking pawl 66 for engagement of the teeth of segment 64 at either position. By such means it will be seen that the axle may be thrown forwardly to locate the traction wheels in advance of geared position, as indicated at 3a, Fig. 2, or in geared position as shown in said figure.

A buffing spring 67 is mounted in bracket 68 on one of the side bars 2 to receive the impact thrust of the axle so that it may be thrown into gear without unnecessary shock of impact. When thus located, as the machine moves over the ground, the traction wheel is somewhat raised as shown, with a degree of penetration into the surface of the soil, thus lowering the cutter 16 to a desired point below such surface, so that its rotation, when thus in gear, will effect disturbance and removal of the soil.

At one or both sides of the rotatable cutter 16 is a downwardly and forwardly extending preliminary plow 69 of any desired form, or preferably curved inwardly and forwardly so as to make a preliminary incision in the soil for loosening in advance of the rotatable cutter. Such plow is fixedly mounted by a U-shaped clevis or bracket 70 and securing nuts, to one side arm 2, and is capable of either vertical or forwardly or backwardly deflected adjustment, depending upon conditions and within the judgment and skill of the operator.

As thus constructed the machine is capable of continuous operation as long as it is propelled over the surface of the ground with the driving traction wheel and its gear 37 in mesh with gear 38. As shown, wheel 31 is somewhat increased in diameter over that of wheel 32, its axle journal being correspondingly elevated above the normal ground level.

When in ordinary transportation to or from location, with the wheels thrust forwardly, no movement will be imparted to the plow mechanism, and it will be elevated above the normal surface of the ground, due to the downward and forward swing of both wheels 31 and 32, thus correspondingly elevating the cutter for non-engagement with the ground.

The machine is capable of rapid and extensive disturbance and removal of earth, either entirely outwardly at one side or only partially so, by proper adjustment of the share-like fender 21, for ordinary plowing. When adapted to the purpose of trench digging, the share may be so adjusted as to throw the separated earth upwardly over one side of the trench or furrow, leaving the opening clear.

The construction and operation of the invention will be readily understood and appreciated from the foregoing description. It is comparatively simple composed of few parts, and is extremely efficient and effective being easily manipulated by the operator, and capable of adaptation to various conditions of surface and soil. It may be variously changed or modified by the skilled mechanic in detail construction or otherwise, but all such changes are to be understood as within the scope of the following claims.

What I claim is:

1. An agricultural implement comprising a frame provided with a transverse U-shaped swinging axle having outer journals, supporting wheels thereon, a rotatable earth cutter, gearing therefor, and backwardly and forwardly adjustable means for connecting one of the supporting wheels in operative engagement with said gearing and for disengagement therefrom.

2. An agricultural implement comprising a frame provided with supporting wheels, a rotatable earth cutter, a rear earth receiving and delivering conduit for the cutter, gearing for the cutter, and means providing forward and backward adjustment of the wheels on the frame for connecting one of the supporting wheels in operative engagement with said gearing.

3. In combination, a supporting frame provided with a cylindrical earth cutter having a rear adjustable delivery extension, means rotatably supporting the cutter, gearing for rotating the cutter, a swinging axle having traction wheels and a gear, and means for adjusting the axle to effect driving connection with the cutter gearing.

4. In combination, a supporting frame provided with a cylindrical earth cutter having a rear adjustable delivery extension, a forwardly extending earth disturbing plow, rollers at opposite sides of the cutter for support thereof, gearing for rotating the cutter, a swinging axle having traction wheels and a gear, and a lever for the axle provided with an adjusting arm.

5. In a digging machine, a double sided frame having a front pulling connection and rear guiding handles, a rear supporting wheel, a front transverse axle journalled on the frame and provided with a traction wheel and a supporting wheel, a gear wheel connected with the traction wheel, a rotatable cylindrical earth cutter, means supporting the cutter, a rear earth discharging shell, and gearing for rotating the cutter including a gear adapted to be driven by the traction wheel gear when the axle is adjusted.

6. In a digging machine, a double sided frame having a front pulling connection and rear guiding handles, a rear supporting wheel, a front transverse axle journalled on the frame and provided with a traction wheel and a supporting wheel, a gear wheel connected with the traction wheel, a rotatable cylindrical earth cutter having a surrounding gear, means supporting the cutter for rotation, a central driving shaft having a pinion engaging the cutter gear and a bevel, a transverse shaft having a co-acting bevel and a sprocket wheel, and driving mechanism therefor embodying a gear adapted to be driven by the traction wheel gear, and means for swinging the axle and its wheels.

7. An earth cutter having a supporting frame adapted to be moved having a rear supporting wheel and forwardly and rearwardly swinging traction wheels, one of said wheels having a gear, a centrally arranged hollow cylindrical cutter having an annular groove and gear wheel, supporting rollers engaging the groove, a rear earth-deflecting extension in groove engagement with the rear end of the cutter, means whereby said extension may be adjusted, and gearing between the traction wheels and the cutter in driving engagement with the latter adapted to be put into connection with the traction wheel gear when it is thrust backwardly.

8. An earth cutter having a supporting frame adapted to be moved having a rear supporting wheel and forwardly and rearwardly swinging traction wheels, one of said wheels having a gear, a centrally arranged hollow cylindrical cutter having an annular groove and gear wheel, supporting rollers engaging the groove, a rear earth-deflecting extension in groove engagement with the rear end of the cutter, means whereby said extension may be adjusted, gearing between the traction wheels and the cutter in driving engagement with the latter adapted to be put into connection with the traction wheel gear when it is thrust backwardly, and lever mechanism for adjusting the axle and traction wheels.

In testimony whereof I hereunto affix my signature.

GEORGE POPP.